Figure 1:
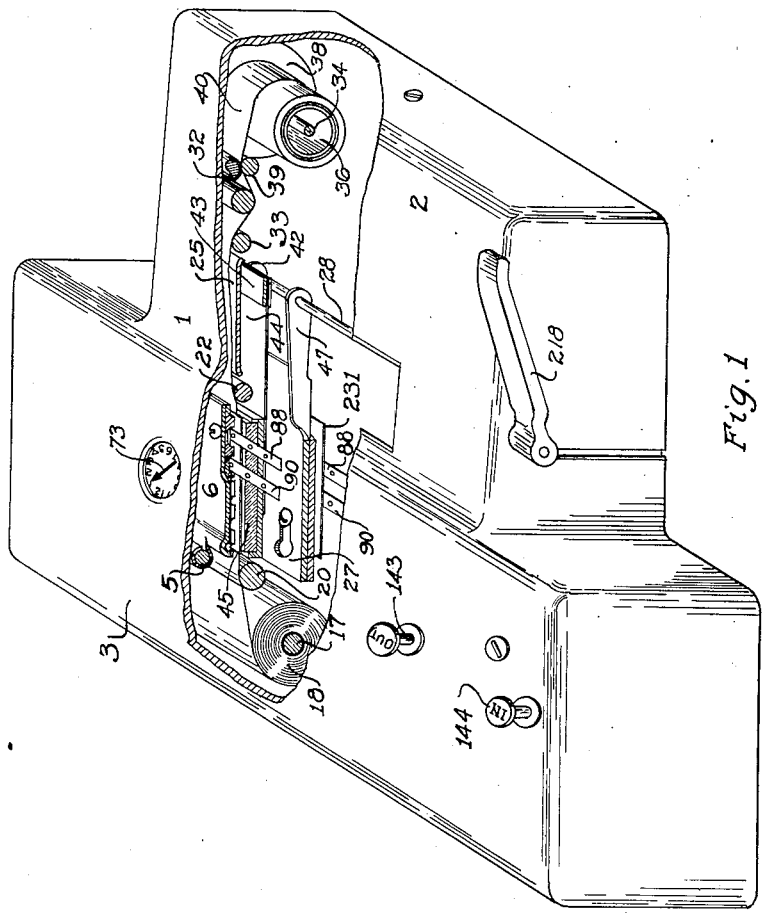

April 1, 1930.  W. J. LOVE, JR  1,752,564
MEANS FOR RECORDING TIME AND PERIOD VALUES
Filed Nov 6, 1924  6 Sheets-Sheet 1

April 1, 1930. W. J. LOVE, JR 1,752,564
MEANS FOR RECORDING TIME AND PERIOD VALUES
Filed Nov. 6, 1924 6 Sheets-Sheet 2
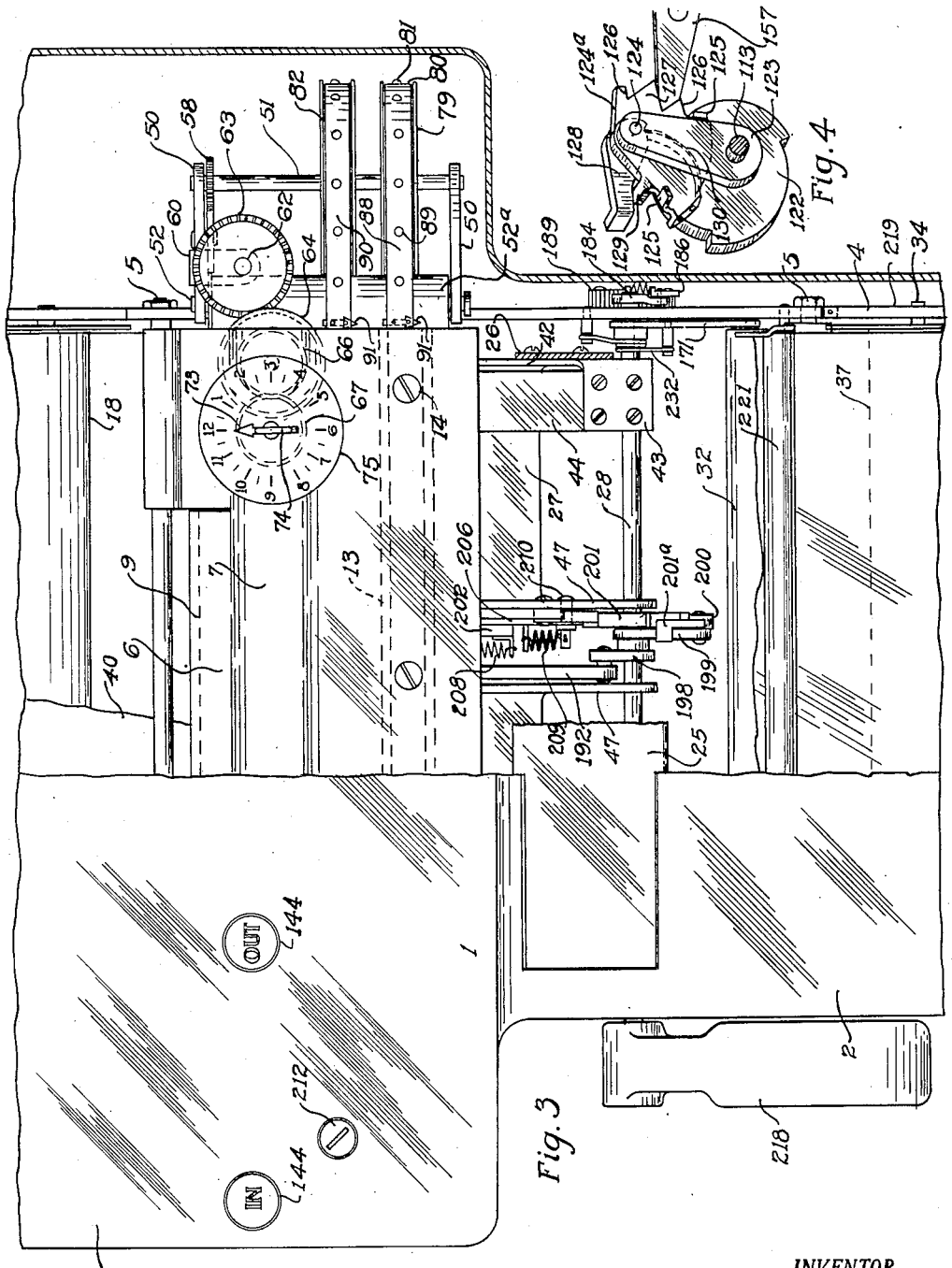

April 1, 1930.  W. J. LOVE, JR  1,752,564
MEANS FOR RECORDING TIME AND PERIOD VALUES
Filed Nov. 6, 1924   6 Sheets-Sheet 3
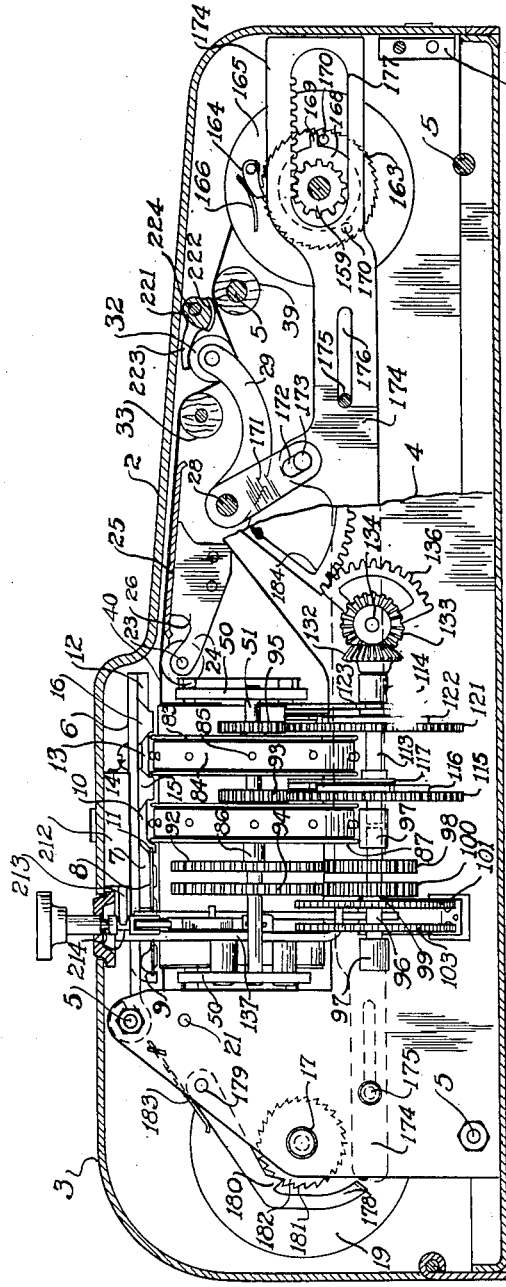
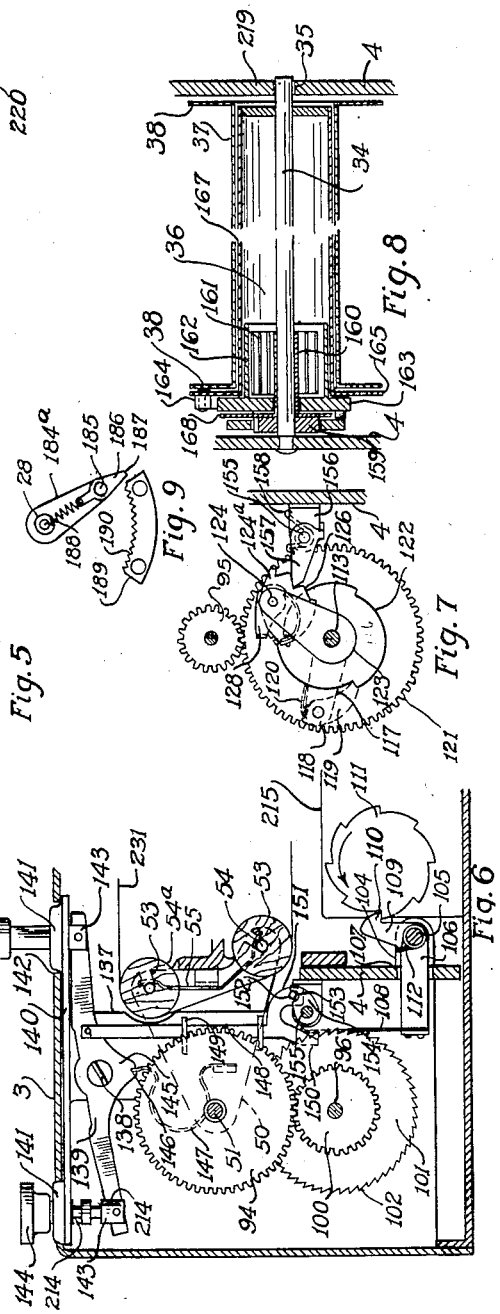
INVENTOR,
William J. Love Jr.
BY Howard S. Smith,
his ATTORNEYS.

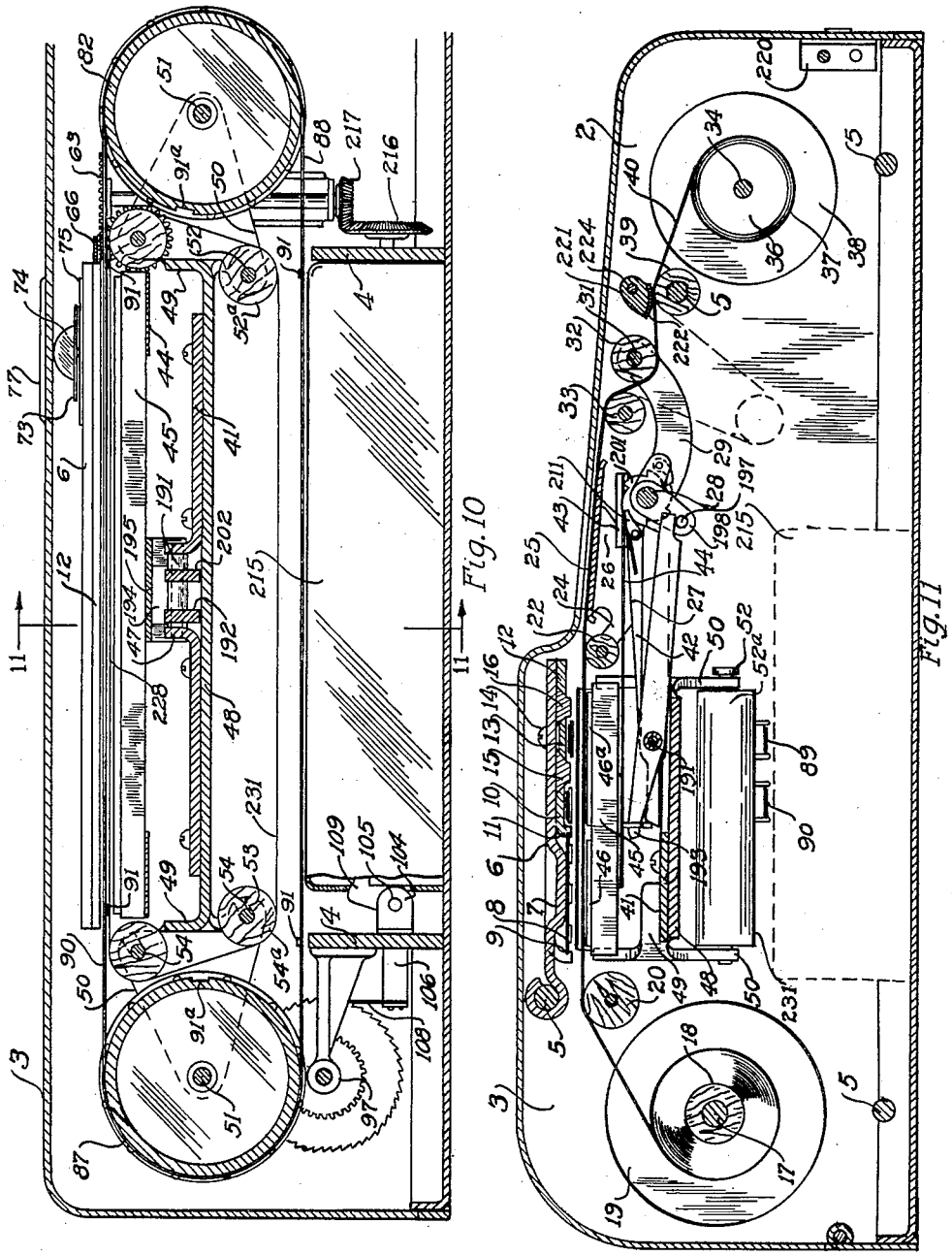

April 1, 1930.  W. J. LOVE, JR  1,752,564
MEANS FOR RECORDING TIME AND PERIOD VALUES
Filed Nov. 6, 1924  6 Sheets-Sheet 5
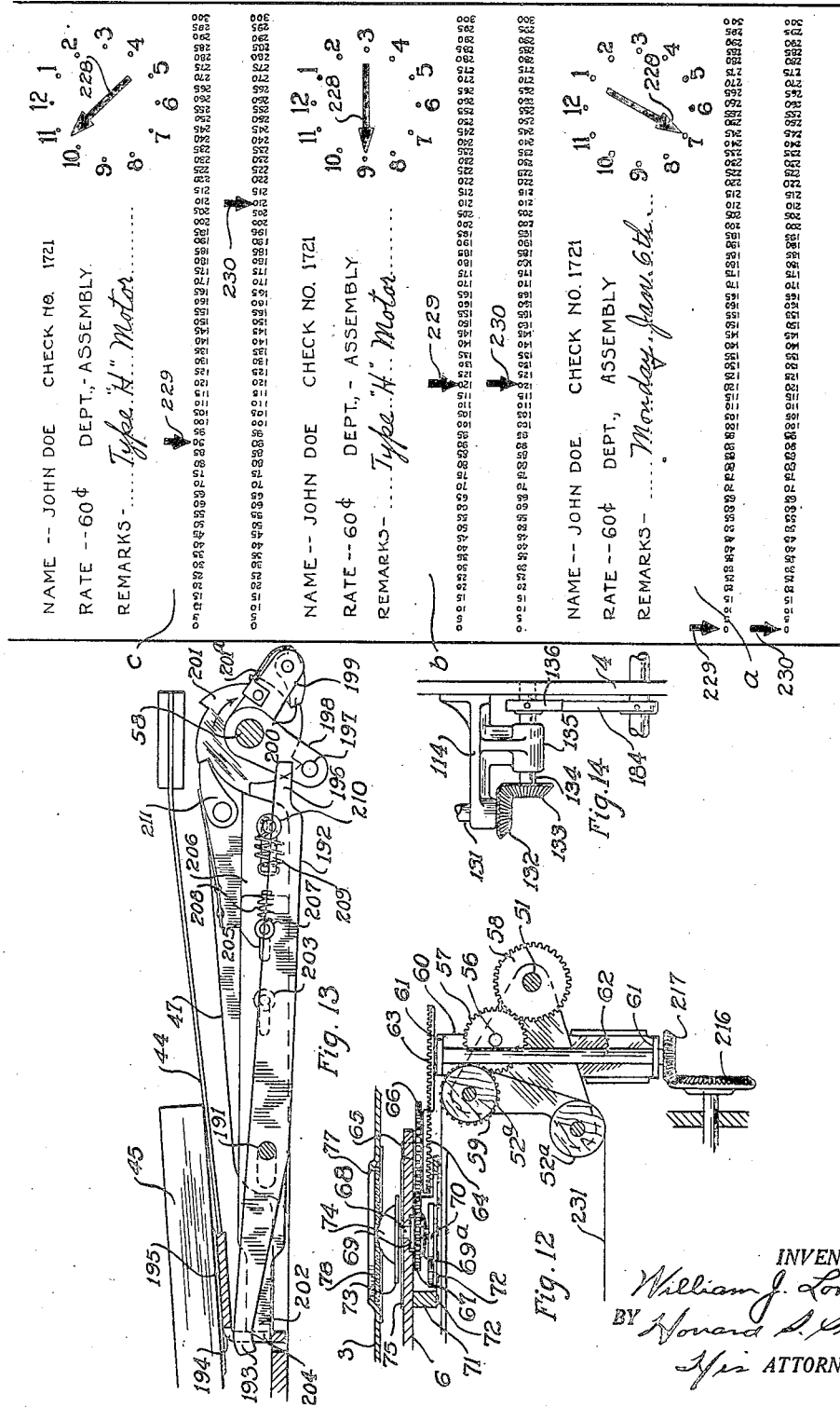

April 1, 1930.  W. J. LOVE, JR  1,752,564
MEANS FOR RECORDING TIME AND PERIOD VALUES
Filed Nov. 6, 1924  6 Sheets-Sheet 6

INVENTOR,
William J. Love Jr.,
BY Howard P. Smith
ATTORNEYS

Patented Apr. 1, 1930

1,752,564

UNITED STATES PATENT OFFICE

WILLIAM J. LOVE, JR., OF PIQUA, OHIO, ASSIGNOR OF ONE-FIFTH TO RALPH W. CARNAHAN, OF DAYTON, OHIO

MEANS FOR RECORDING TIME AND PERIOD VALUES

Application filed November 6, 1924. Serial No. 748,165.

This invention relates to new and useful improvements in means for recording time and period values, and has particular reference to a cash value calculating and a cash value accumulating, registering device.

It is one of the principal objects of my invention to provide an improved, simplified, time-controlled calculating device.

It is another object of my invention to provide a time and rate controlled calculating device.

Another object of my invention is to provide a device that requires but one operation by the operator to accomplish all recordings, and which produces an entirely confidential record. It is another object of my invention to provide a device that can operate on a printed record tape or print its own forms, as may be desired. It can also print manifold forms if desired by the simple addition of another roll of carbonized paper, or in conjunction with a carbon sheet.

My invention provides a complete time and cash value recorder for both job and pay roll purposes, thereby eliminating all mental or other additional calculating processes required with time clocks, job recorders and the like now on the market.

In the case of the time recorder, the time of day in and out only is recorded for pay roll purposes, making it necessary to reduce the result thus recorded to elapsed time, and then computing at the operator's rate to get the desired cash value result.

In the case of job recorders, most of which indicates the time of day in and out on the job and others of which record, in addition, the elapsed time, it is necessary to ascertain the rate per hour of the operator and then reduce the elapsed time to cash for the desired cash result. Then, if a time recorder is not used in connection with the job recorder, the several job cards must be examined to arrive at the pay roll hours of the worker and these totaled to get the amount of the operator's pay for the period.

My invention records the time of day, the cash value of each job at the operator's rate and the total earnings for each period. Therefore, the record made by the operator on my device is the final information desired.

My invention is thus a job cash and period pay roll recorder, and in addition, records the time of day. It is essentially based on the cash value of time rather than upon time reduced later to cash, or to elapsed time and then to cash.

My invention contemplates the provision of time-controlled bands or belts carrying indicators such as arrows, and moving continuously in relation to stationary rate slugs to bring the arrows to positions opposite certain numerals on the slugs to give desired information at selected times. At those times all the numerals on the slugs, together with the positions of the arrows with relation to them, are printed on a medium such as a removable tape.

For example, the arrow on one belt at the time a recording is printed, will, by its position opposite a set of numerals on one rate slug, indicate the cash value of a job or any portion of a period, while the arrow on a separate belt will, by its position opposite the numerals on a second slug, point out the accumulated earnings for that period.

The rate slugs are easily removable and interchangeable to make it possible at a moment's notice to adjust the machine for calculation at any given rate. The numerals are so spaced upon the face of the slug that their lineal spacing will represent a unit of time, and the difference in value of adjacent groups of numerals, the cash value of said unit of time at a rate of pay for which the slug is intended. For instance, if a period of one hour is divided into 12 spaces, each space will represent 5 minutes; and if the rate is 60 cents per hour, the numerals will read, 0, 5, 10, 15, 20 and so on in lineal spacing.

My invention provides a method of controlling the movable belts and indicators to compute and print the exact money value of the elapsed time, and also a method of resetting the job indicator back to zero after the printing for each of the portions of the period covered.

It is still another object of my invention to provide a method of continuing the computation of the cash values at the same time that the portions of the periods are separately computed and recorded, and to reset the same to zero at the end of any given period.

My invention contemplates means for printing the recordings on a removable tape so that all or any desired part of them are seen only upon the removal of the tape from the machine. Upon the tape space is set apart for the operator's hand-written information. The records which are made by my device are concealed from the view of unauthorized persons, and may be removed or examined only by those empowered to do so.

My invention also contemplates means for employment in conjunction with the above means, to print any desired matter on the removable tape, such as forms for receiving the name of the operator, his check number, the machine number, the department number and the like.

Figure 2:
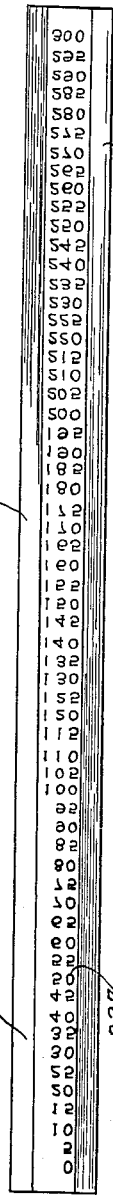
Figures 16, 17:
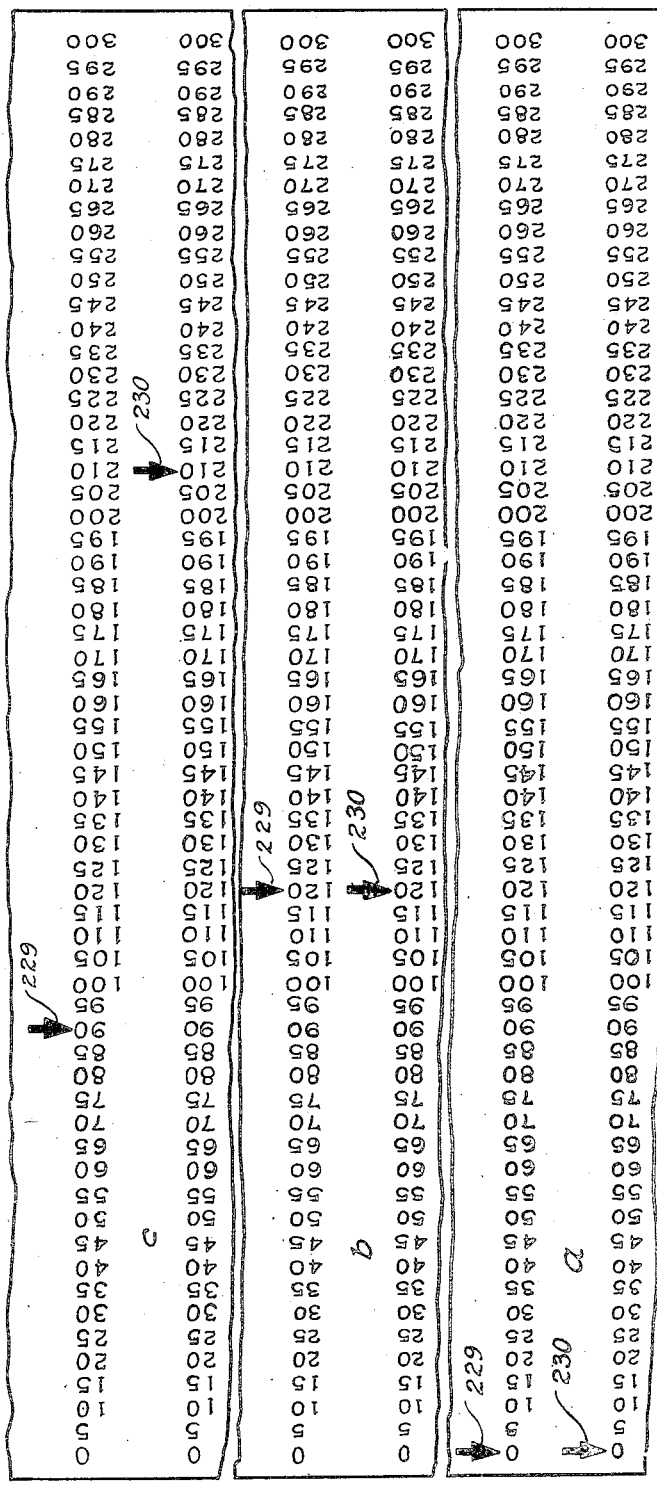

In the accompanying drawings, Figure 1 is a reduced scale perspective view of my time and period value recording device, partly broken away to reveal its mechanism. Figure 2 is an enlarged view of a rate slug. Figure 3 is a top plan view of the device, showing the "In" and "Out" control buttons, the time indicator and the printing mechanism. Figure 4 is an enlarged perspective view of the period value clearing mechanism. Figure 5 is a longitudinal view of the device, with the case broken away to show the feed, rewind, indicator drive and clearing mechanism. Figure 6 is a transverse sectional view, showing the indicator drive and the "In" and "Out" control mechanism. Figure 7 is a side view showing the clearing and "In" and "Out" selector mechanism. Figure 8 is a sectional view of the rewind roll mechanism. Figure 9 is a side view of the full stroke mechanism. Figure 10 is a transverse sectional view, showing the indicator drive belts and the inking-ribbon mounting mechanism. Figure 11 is a sectional view on the line 11—11 of Figure 10, showing the rate slug mounting mechanism and the path of the paper tape through the device. Figure 12 is a side view of the time indicator drive mechanism. Figure 13 is an enlarged view of the impression trip and reset mechanism. Figure 14 is a plan view of the clearing shaft driving mechanism. Figure 15 is an actual size view of the paper record, showing the general arrangement thereof. Figure 16 is an enlarged view of the rate scales and indicators shown on Figure 15. And Figure 17 is an actual size view of the graphotype slug.

Referring to the accompanying drawings for a detailed description of my invention, the numeral 1 designates an outer case or cabinet having a reduced front portion 2 providing a writing table and a housing for the printed record, and an enlarged rear portion 3 which forms a housing for the paper supply roll and main mechanism to be hereinafter described. (See Figures 1, 3 and 11.)

On each side of the operating mechanism within the case 1 is an inner frame 4 which extends the entire length of the case and which, with four cross supporting members 5, form a support for all the mechanisms to be described. (See Figures 5 and 11.)

Freely mounted upon the upper rear cross support 5 between the inner frames 4, 4 is a carriage 6 extending horizontally toward the front of the machine and having a transverse depression 7 at its center portion to support a graphotype slug 8. (See Figures 5 and 11.) Between the depression 7 and the cross support 5 the carriage 6 is formed with a depending flange 9 to provide a recess which receives one edge of the slug 8. Fixedly secured to the underside of the carriage 6 and adjacent to the depression 7, is an L shaped member 10 having in one end a recess 11 to receive the other side of the slug 8. The other end of the member 10 is beveled to provide, in connection with the carriage 6, a dovetail slot for a purpose to be hereinafter described.

Secured to the under side of the front end of the carriage 6 is another transverse member 12 whose inner edge is beveled. (See Figures 5 and 11.) Intermediate the members 10 and 12, and likewise projecting across the carriage 6, is a lock bar 13 whose opposite edges are beveled. This lock bar is removably attached to the carriage 6 by screws 14 projecting through the latter and received by threaded holes in the lock bar. The beveled edges of the lock bar 13 form with the under surface of the carriage 6 and the beveled edges of the transverse members 10 and 12, two dovetail slots which receive rate slugs 15 and 16. These rate slugs, which will be hereinafter more fully described, are held firmly in these slots by tightening the screws 14 that pass through the carriage 6 into threaded holes in the lock bar. (See Figures 5 and 11.)

Projecting through holes in the extreme rear portions of the inner frames 4, 4 is a removable pin 17 upon which there is rotatably mounted a paper supply spool 18 formed with an integral flange 19 at each end. (See Figures 1 and 11.) Adjacent this spool under the cross member 5 for the carriage 6, and extending between the inner frames 4, 4, there is a guide roller 20 having axial projections 21 which are received in holes in said inner frames. (See Figures 5 and 11.)

Below the front end of the carriage 6 and projecting between the inner frames 4, 4, there is freely mounted another roller 22 having axial projections 23, each of which is received by a bracket 24. The top of this roller 22 is in horizontal alinement with the top of the roller 20. (See Figures 5 and 11.)

Directly below an oblong opening in the top of the reduced portion 2 of the case 1, and in front of the roller 22, there is a flat member or table 25 whose front and rear edges are beveled. The opposite ends of the table 25 are formed downward to provide on each end a support 26 having as an integral part the bracket 24. This support is attached to a main carriage 27 to be hereinafter described. (See Figures 3 and 11.)

Below the table 25 there is an operating shaft 28 which is journaled in the inner frames 4, 4, and whose left end extends through the case 1. Fixedly secure to the shaft 28 adjacent to the inner face of each inner frame 4, is an arm 29 preferably of curved contour and having in its outer end a hole 30 adapted to receive an axial projection 31 at each end of a roller 32 which is free to rotate. (See Figure 11.)

In front of the table 25 is a roller 33 having axial projections which are received by holes in the inner frames 4, 4, and whose top surface is tangent with the top surface of the table 25. (See Figures 5 and 11.)

In the front portion 2 of the case 1, there is fixedly secured to the left inner frame 4 a shaft 34 whose free end projects into a hole 35 in the right inner frame 4. Mounted on the shaft 34 is a rewind mechanism 36 to be hereinafter described and upon which is keyed a removable spool 37 having a flange 38 at each end. (See Figures 8 and 11.) Between the spool 37 and the roller 32 there is a roller 39 which is free to rotate about one of the front supports 5 between the inner frames 4, 4.

The spools 18 and 37, the table 25, and the rollers 20, 22, 32 and 34 define the path of, and are the means for guiding, a recording medium such as a paper tape 40, whose movement will now be described. From the supply roll upon the spool 18, the paper strip 40 is fed over the roller 20, under the carriage 6, over the roller 22, the table 25 and the roller 33, thence downwardly under the roller 32, over the roller 39 to the rewind spool 37, by a method of feeding and rewinding to be hereinafter described. (See Figures 5 and 11.)

The main carriage 27 consists chiefly of a flat portion 41 extending towards the rear part of the device and having at each side an upturned lug or ear 42 through the outer end of which passes the operating shaft 28. Formed at right angles to, and integral with, the upper edge of the ear 42 is a projecting spring support 43 to which there is fixedly secured the impression spring 44. (See Figures 3, 10 and 11.)

Attached to the free end of the spring 44 is an impression block 45, whose upper face is recessed to receive a narrow impression pad 46 for the information on the slug 8, and a wider impression pad 46ª for the job cash and period values on the slugs 15 and 16. (See Figure 11.)

At the center of the carriage 27 there are formed two upturned ears 47 which, like the ears 42, have in their outer ends holes in which the shaft 28 is free to rotate. These ears serve to provide additional support for the carriage 27. (See Figure 3.)

Attached to the under side of the flat portion 41 of the carriage 27, is a secondary carriage 48 extending between the inner frames 4, 4 and having adjacent to the latter upturned portions 49 adapted to reinforce or stiffen the secondary carriage. Formed at right angles to, and extending outwardly from, the front and rear ends of each portion 49 of the secondary carriage 48, is a bracket 50 preferably of triangular shape. (See Figures 5, 6 and 10.)

In the extreme outer ends of each pair of brackets 50 are registering holes which receive the ends of a shaft 51. The opposite inner corners of the triangular brackets 50 on the right side of the device have registering holes which receive removable pins 52, upon each one of which an inking ribbon roller 52ª is freely mounted. (See Figures 3 and 12.) The opposite inner corners of the triangular brackets 50 on the left side of the machine contains elongated slots 53 which receive the axial projections 54 of left inking rollers 54ª, 54ª. (See Figures 6 and 10.)

A flat spring 55 is attached at its middle point to the outer face of each one of the left brackets 50. The ends of this spring 55 are free and are formed to receive the projections 54 in the left inking rollers 54ª, 54ª. It is the function of this spring to force the rollers 54ª, 54ª toward the bottom of their respective slots 53, 53 in their brackets 50. (See Figure 6.) They also place the necessary tension upon the inking ribbon.

Mounted upon the inner face of the rear bracket 50 on the right side of the device, is a stud 56 upon which there is freely mounted an idler gear 57 having upon its periphery suitable teeth for engagement with a gear 58 fixedly secured to the right shaft 51, and a gear 59 fixedly secured to the upper right roller 52ª. (See Figure 12.) The purpose of this train of gears is to impart an intermittent one-way motion to the upper right roller 52ª when the shaft 51 is rotated by means hereinafter to be described.

Attached to the outer face of the rear bracket 50 on the right side of the device is another bracket 60 preferably of C shape, whose upper and lower extremities are formed inwardly to provide supports 61, 61 for a vertical shaft 62 which is free to rotate and which has fixedly secured to its upper end a gear 63. This gear 63 has formed upon its upper face teeth adapted to engage teeth similarly formed on the lower face of a mating gear 64. The gear 64 is free to rotate about a stud 65 secured to the lower face of the carriage 6, and has integral therewith a gear 66 having upon its periphery suitable teeth for engagement with a gear 67. (See Figures 3 and 12.)

Projecting through the carriage 6 adjacent to the stud 65 is a shaft 68 which is free to rotate and has an intermediate shoulder 69 at its central portion and adjacent to the lower face of said carriage 6. Free to rotate about the shaft 68 and adjacent to the shoulder 69 thereon, is the gear 67 which is held in contact with the latter by means of a friction washer 69$^a$. The gear 67 may thus effect a rotation of the shaft 68 by means of friction, and provide a practical method whereby the position of the shaft 68 may be adjusted by means to be hereinafter described without disengaging or disturbing the driving mechanism of the gear 67. (See Figure 12.)

Attached to the extreme lower end of the shaft 68 is an arrow 70 adapted to rotate within a circular enclosure 71, upon the lower face of which are arranged raised figures 72 in substantially the same plane as the lower face of the arrow 70 and the faces of the slugs 15 and 16 and 8. The figures upon the said circular enclosure are arranged vertically to read from the front of the operator's position, and are twelve in number, to wit, 1—2—3—4—5—6—7—8—9—10—11—12, representative of the twelve numerals of the standard clock dial. It is the purpose of this rotatable arrow and the stationary circular enclosure to cause to be printed upon the recording tape 40, the time of day at which the recording is made. (See Figures 3, 12 and 15.)

Attached to the extreme upper end of the shaft 68 is an arrow 73 similar in contour to the arrow 70 and having an integral wing 74. Secured to the upper face of the support 6 is a dial 75 upon which are arranged in circular form, other figures of the same kind, and in the same positions, as the Figures 72 on the enclosure 71. A circular opening 77 is provided in the enlarged portion 3 of the case 1, directly over the dial 75. Mounted over this opening 77 is a glass cover 78 to exclude dirt and other foreign matter, to prevent the unauthorized adjustment of the recording mechanism and to render available a means of ascertaining the correctness of the clock setting without opening the case 1. (See Figures 10 and 12.) Persons authorized to do so may make any necessary adjustment of the arrows 70 and 73 through the opening 77, by moving the arrow 73 through its finger grip or wing portion 74.

Secured to the right shaft 51 adjacent to the front bracket 50 is a flanged pulley 79 having a flat groove 80 upon its periphery, and in the center of which there are axial projections or studs 81. There are twelve of these studs equally spaced about the periphery of the pulley. Adjacent to the pulley 79 and freely mounted upon the shaft 51, is a pulley 82 similar to said pulley 79. (See Figure 3.)

Secured to the shaft 51 on the left side of the device is a pulley 83 which, like the pulley 79, has formed in its periphery a flat groove 84 in the center of which there are axial studs 85. There are 12 of these studs equally spaced about the circumference of the pulley 83. (See Figure 5).

Free to rotate about the shaft 51, adjacent to the pulley 83, is a sleeve 86. To the central portion of the latter there is fixedly secured a pulley 87 similar to the pulley 83. (See Figure 5.)

The function of the four pulleys 79, 82, 83 and 87 will now be described. Passing over the pulley 83, thence across the device under the carriage 6, around the pulley 79, and thence back to the pulley 83, is an endless flat metallic belt 88 having equally spaced holes 89 therein for engagement by the axial studs 81 and 85 upon the pulleys 79 and 83 respectively. Another belt 90 passes in a like manner over the pulleys 82 and 97. (See Figures 1, 3 and 10.)

Attached to the belts 88 and 90, and having a spacing equivalent to the circumference of the flat grooves of the pulleys 72, 82, 83 and 87 are four indicators such as the arrows 91 adapted to move between the slugs 15 and 16. (See Figures 3 and 10.) The indicators 91 when passing around the pulleys, are received by a recess 91$^a$ provided in the bottom of the groove of each. (See Figure 10.)

The method of rotating the pulleys and setting the indicators to zero will now be described. Attached to the rear end of the sleeve 86 is a spur gear 92, and to the opposite end of said sleeve 86 between the pulleys 83 and 87, a pinion 93. There is also fixedly secured to the shaft 51, adjacent to the gear 92, another spur gear 94; and to the opposite end of the shaft 51, another pinion 95. (See Figure 5.) Adjacent to the outer face of the left inner frame 4, and below the shaft 51, there is a shaft 96 parallel to the shaft 51 and free to rotate in brackets 97 attached to the inner frames 4, 4. (See Figure 5. Fixedly secured to the shaft 96, is a pinion 98 adapted to engage the gear 92. Adjacent to the gear 98 and free to rotate about the shaft 96, is a sleeve 99 to one end of which there is secured a pinion 100 likewise adapted to engage the gear 94 and having secured to its opposite end a ratchet wheel 101 upon the periphery of which are sixty equally spaced ratchet teeth 102. (See Figures 5 and 6.)

Secured to the shaft 96, adjacent to the ratchet wheel 101, is another ratchet wheel 103 similar to the ratchet wheel 101. (See Figures 5 and 6.) Attached to the inner face of the left inner frame 4, adjacent to the ratchet wheels 101 and 103, are two L shaped supports 104, 104 having in their extended ends holes adapted to receive the ends of a rocker shaft 105 upon which there is rotatably mounted an L shaped rocker arm 106. (See Figures 6 and 10.) The horizontal portion of this rocker arm 106 projects through an opening 107 in the left inner frame 4, and carries at its extreme end a right-angled projection to which there is attached a vertical, flexible steel spring 108 of sufficient length and width to engage the teeth of the ratchet wheels 101 and 103. (See Figures 5 and 6.)

The vertical portion 109 of the rocker arm 106 has an integral foot or cam follower part 110 that is held in contact with a ratchet wheel 111 by a spring 112 coiled about the rocker shaft 105. (See Figure 6.) Now, when the ratchet wheel 111 is rotated by means to be hereinafter described, an intermittent motion will be imparted to the spring 108, which, in turn, will communicate a like motion to the ratchet wheels 101 and 103. Since the pinions 98 and 100 are driven by the ratchet wheels 101 and 103, and these pinions in turn engage the gears 92 and 94, a like intermittent motion will be transmitted to the pulleys 83 and 87 and their respective belts 88 and 90. (See Figures 5 and 6.) These belts are cleared by the following means.

In alinement with the shaft 96 there is another shaft 113 which projects toward the front of the case 1, and which has one end journaled in one of the brackets 97, and its other end journaled in a bracket 114 attached to the outer face of the left inner frame 4.

Freely mounted upon the shaft 113 is a gear 115 adapted to engage the pinion 93 attached to the sleeve 86, and having secured to its right face a three-lobed cam 116. Adjacent to the cam 116 and fixedly secured to the shaft 113, is an arm 117 having pivoted at its outer end 118, a pawl 119 which is held in engagement with the cam 116 by means of a spring 120. (See Figures 5 and 7.)

Freely mounted upon the shaft 113 is another gear 121 similar to the gear 115 and adapted to engage the pinion 95 adjacent the pulley 83. Secured to the right face of the gear 121 is another three-lobed cam 122 similar to the cam 116. (See Figure 5.)

Fixedly secured to the shaft 113 and adjacent the cam 122, is another arm 123 having attached to its outer end a pivot pin 124. (See Figure 4.) Freely mounted upon the pivot pin 124 is a selector quadrant 124ᵃ upon the periphery of which two projections or stops 125, 125 are formed at right angles to the quadrant to limit the angular travel of the latter about the pin 124. There are also formed upon the periphery of the quadrant two projections 126, 126, and at a middle point between them there is a V shaped projection 127. The purpose of the projections 126, 126 and 127 will be hereinafter described. (See Figure 4.)

Likewise freely mounted upon the pin 124 is a pawl 128, the free end of which is held in engagement with the three-lobed cam 122, or a stop 129 formed integral with the quadrant 124ᵃ, dependent upon the position of the quadrant. The pawl 128 is held in either of these two positions by means of a spring 130 whose fixed end is secured to the quadrant 124ᵃ.

Attached to the extended end 131 of the shaft 113 is a bevel gear 132 adapted to engage a similar bevel gear 133 fixedly secured to the end of a shaft 134 which is journaled in a bearing 135 integral with the bracket 114 and whose opposite end is journaled in a hole in the left inner frame 4. (See Figures 5 and 14.) Adjacent to the outer face of the left inner frame 4, and secured to the shaft 134, is a toothed sector 136 driven by means to be hereinafter described. (See Figures 5 and 14.)

The means for operating the selector quadrant and disengaging the drive mechanism will now be described. Secured to the inner face of the left rear bracket 50 is a support 137 having pivoted near its upper end, on a screw 138, a rocker arm 139. (See Figure 6.) Formed at right angles to the support 137 is a guide plate 140 having formed at each end an inverted cup-like depression 141. These depressions 141, 141 project through holes in the rear portion 3 of the case 1. In each one of these depressions there is a hole through which passes a stem 143 that carries an operating key 144. (See Figures 1 and 6.) The lower ends of the stems 143, 143 are pivotally connected to the rocker arm 139.

Integral with the rocker arm 139 at its central portion is a projection 145 having a recess 146 to receive the free end of a flat spring 147 formed to C shape and having its opposite end attached to the support 137. Attached to the right side of the rocker arm 137 is an operating bar 148 for operating the selector quadrant and disengaging the drive mechanism. The operating bar is movable vertically through guides 149 attached to the support 137. The lower end of the bar 148 terminates on the left side in a cam-like projection 150 whereby, when the bar 148 is in its downward position, the spring 108 is held out of engagement with the teeth of the ratchets 101 and 103. (See Figure 6.) And when the bar 148 is in its raised or "up" position, it is not in contact with the spring 108, leaving the latter free to engage the teeth of the ratchet.

The right side of the lower end of the bar 148 terminates in an L shaped projection 151 having secured on its extreme end a pin 152. This pin is received by a slot 153 in the outer end of a lever 154 that is fixedly secured to one end of a shaft 155. This shaft is free to rotate in brackets 156, 156 attached to the outer face of the left inner frame 4. (See Figure 7.) Secured to the opposite end of the shaft 155 is a selector arm 157 in substantially the same plane as the quadrant 124ª and adapted to engage the projections 126, 126 in the latter as follows. When the bar 148 is in its lower or "down" position, the selector arm 157 will engage the upper projection 126, and when in its "up" or raised position, the selector arm will engage the lower projection 126 in said quadrant. The function of these parts is to control the clearing of the indicator belts 88 and 90.

The selector arm is held in alinement with the lower projection 126 of the quadrant 124ª by a helical spring 158 which is coiled about the shaft 155. This spring 158 keeps the pin 152 in the slot 153 of the lever 154 at all times. (See Figure 6.)

The paper feed and rewind mechanism will now be described. The rewind mechanism 36 consists essentially of a gear 159 on the end of a sleeve 160 free to rotate about the shaft 34. (See Figures 1 and 8.) Fixedly secured to the sleeve 160 is the inner end of a helical flat spring 161 whose outer end is attached to a barrel 162. Secured to the outer end of the latter adjacent the flange 38, is a ratchet wheel 163 adapted to engage a pawl 164 when the wheel 163 is rotated clockwise. The pawl 164 is pivoted to a flange member 165, and is held in contact with the ratchet wheel by means of a spring 166.

The rewind mechanism is enclosed by a sleeve 167 extending the entire length of the spool 37 and having integral with its left end the flange member 165. (See Figures 5 and 8.)

Between the ratchet wheel 163 and the gear 159 is a disc 168 having a single projection 169. Secured to the ratchet wheel 163 in radial positions to be engaged by the projection 169, are two pins 170, 170 whose angular spacing permits a flexible drive of the spool 37 through the spring 161, to permit in its rotation the variations necessary to accommodate the increasing diameter of the paper being wound upon the spool.

The following mechanism controls the movement of the paper when the operating handle is depressed. Attached to the shaft 28 between the arm 29 and the left inner frame 4, is a lever 171 which contains in its outer or lower end an elongated slot 172 that receives a pin 173. This pin is fixedly secured to an operating slide 174 which is attached to the inner face of the left inner frame 4 by a series of shouldered rivets 175. These rivets pass through elongated slots 176 in the slide 174, and thereby provide for a lateral movement of the bar 148 co-extensive with said slots. (See Figure 5.)

In the front end of the slide 174 is an oblong opening 177, and formed in its surface above this opening are rack teeth suitable to engage the teeth of the gear 159. (See Figure 5.) The opposite end of the slide 174 is rounded to engage a release pawl 178 pivoted at its upper end on a stud 179 secured to the inner face of the left inner frame 4 and having formed at its central portion a projection 180 to engage the teeth 181 of a ratchet wheel 182 which is fixedly secured to the supply spool 18. The projection 180 on the pawl 178 is held in contact with the ratchet wheel 182 by a flat spring 183 whose inner end is secured to the left inner frame 4. (See Figure 5.)

Secured to the shaft 28, adjacent to the outer face of the left inner frame 4, is a tooth member 184 to engage the teeth of the quadrant 136, being adjusted to effect a rotation of the latter to drive the clearing mechanism when the shaft 28 is rotated by means to be hereinafter described.

For the purpose of compelling a full movement of the operating shaft 28, thereby being known as the full-stroke mechanism, there is secured to the right end of said shaft, an arm 184ª which carries on its outer end a stud 185. Freely mounted upon this stud is a pawl 186 having an outer pointed end 187. This pawl is held in alinement with the center line of the arm by means of a coiled spring 188 whose inner end is attached to the shaft 28 and whose outer end is secured to the inner end of the pawl. (See Figure 9.) Secured to the outer face of the right inner frame 4 is a toothed sector 189 having upon its periphery a series of teeth 190 adapted to be engaged by the pawl 186 in such a manner as to force the pawl out of alinement with the center line of the arm 184ª. (See Figure 9.)

The method of tripping and resetting the impression mechanism will now be described. Extending between the upturned ears 47 of the carriage 27 below the impression block 45, is a pin 191. A reset arm 192 is pivoted at its central portion upon the pin 191, and has at one end a finger-like projection 193 adapted to engage in an open slot 194 in a latch member 195 that is secured to the under side of the impression block. The other end of the arm 192 terminates in a finger-like projection 196 similar to the projection 193 and engaged by a pin 197 which is fixedly secured to the outer end of a reset lever 198. (See Figures 3 and 13.)

Adjacent to the lever 198 and integral therewith is a lever 199 having pivoted to its outer end a pawl 200 which is held in contact with a six lobed cam 201 by means of a flat spring 201ª. The lobes of the cam 201 serve a double purpose. A latch bar 202 is adapted to move horizontally on the pin 191 and a shouldered rivet 203 which is secured to the right upturned ear 47 and which has at its end adjacent to the latch member 195 a tapered portion 204. The opposite end of the latch bar 202 has an elongated slot 205 by means of which said bar is slidingly attached to an operating bar 206 with a shouldered rivet 207 that likewise limits the travel of the latch bar 202 relative to the operating bar 206. A coil spring 208 attached to the inner end of the latch bar 202 and an extension on the rivet 207, holds the latch bar in an advanced position. The operating bar 206 is held in contact with the cam 201 by a spring 209, one end of which is attached to the bar 206 and the other end of which is secured to a projection on a shouldered rivet 210. The latter engages in an elongated slot in the bar 206 to permit it to have a like horizontal movement coextensive with the slot. (See Figure 13.)

The bar 206 terminates in a cam follower adapted to engage one of the lobes of the cam 201. There is likewise attached to the support 47 adjacent the rivet 210, a pawl 211 for engagement with the lobes of the cam 201. (See Figures 3 and 13.) The operation of this mechanism for tripping and resetting the impression block 45 will be later described.

Attached to the inside of the case 1 in its enlarged rear portion 3, and adjacent to the operating keys, is a spring lock 212 adapted to be operated by a key inserted through the case and having a bolt 213 with a U-shaped recess in its outer end. The stem 143 of the "In" operating button or key 144 is provided with two circumferential grooves 214, 214 which will be engaged by the bolt 213 when the latter is in alinement with either of the grooves. This serves to lock the control mechanism in both the "in" and "out" positions. (See Figures 5 and 6.)

Located in the lower part of the case 1 under the recording mechanism is an electrically or spring-driven clock mechanism 215 of which the ratchet wheel 111 is an integral part and by which it is caused to rotate in a counterclockwise direction three revolutions per hour. (See Figures 10 and 11.)

In the right side of the clock mechanism is a gear 216 having upon its outer face bevel teeth adapted to engage the teeth of a bevel gear 217 secured to the lower end of the vertical shaft 62. (See Figures 10 and 12.) The function of these gears is to drive the time recording indicators.

Attached to the extreme left end of the shaft 28 is an operating handle 218 which, during a 60 degree rotation, will effect all the necessary operations of the device through the means hereinbefore described. (See Figures 1 and 3.)

The right inner frame 4 has at its front portion a hinged section 219 adapted to swing outwardly when the case 1 is removed, thereby permitting the spool 37 to be withdrawn to remove the printed matter or record. (See Figures 3 and 8.)

The case 1 is preferably hinged at its rear portion, and is provided at its front end with a bar lock 220, the bars of which engage holes in the inner frames 4, 4 to prevent all unauthorized persons from opening the case. (See Figures 5 and 11.)

In order to prevent withdrawals of paper from the spool 18 when the handle 218 is depressed, an eccentric quadrant 221 is provided adjacent the roller 39. This quadrant has a transversely ribbed non-slipping surface 222. Fixedly secured at each end of the quadrant 221 is a release arm 223 which is engaged by the roller 32 when the latter is in the "up" position. The quadrant 221 has at each end an axial projection 224 that is received by a hole in each one of the inner frames 4, 4. When the operating handle 218 is depressed and before the pawl 180 disengages the ratchet 182, the quadrant 221 will drop down and hold the paper tape 40 between its ribbed surface 222 and the roller 29. (See Figures 3, 5 and 11.)

Each one of the rate slugs 15 and 16 comprises an elongated member having its opposite edges 225 and 226 beveled for reception by the dovetail slots formed by the parts 6, 10, 12 and 13. (See Figures 2 and 5.) Upon the face of each one of the rate slugs 15 and 16 are electrotyped or raised figures 227. The length of the scale upon each slug is representative of a given period of time, which is the capacity of a single recording of the device. The scale of figures 227 is subdivided into fractions of hours—in this instance, one twelfth hours. At each division is a number which represents the value of the elapsed time from its position to the zero or starting one. In the instance of a rate of pay of 60¢ per hour, the value of the numbers will be as shown on the slug in Figure 2, to wit, 5, 10, 15, 20, 25 and 30 cents from the zero or starting position to 300 cents at the opposite end of the slug, representing 5, 10, 15, 20, 25 and 30 minute values respectively to the last, or five hour value.

The operation of my time and period value recording device will now be described. With the clock mechanism 215 in operation, it is assumed that the time and period values of the work of John Doe, an assembler, check number 1721, are being recorded at the rate of 60¢ per hour. A rate slug 15 is inserted in the left dovetail slot in the device, and another slug 16 having the same scale as that shown in Figure 2, is inserted in the right dovetail slot. (See Figure 11.) The rate slug 15 will register the job cost values and the rate slug 16 the period values.

A graphotype slug 8 having upon it the employee's name, check number, rate of pay, department in which employed, and a space for hand written information, as shown in Figure 17, is inserted in the carriage 6.

Upon starting the day's work, John Doe, having a proper key, unlocks the lock 212 and depresses the "In" button 144 and the operating handle 218, causing to be printed upon the paper tape 40 his starting time, which is 7 o'clock, as indicated by the arrow 228 upon the ticket "a" in Figure 15. At this point the value of the elapsed time is zero, as indicated by the "0" positions of the job cost arrow 229 and the period value arrow 230 on the ticket. The information contained upon the slug 8 is printed across the top of the ticket to the left of the time indicator 228.

A ten degree depression of the operating handle 218 will effect a printing of the above data, by withdrawing the latch bar 202 from the latch member 195, thus permitting the impression pads 46 and 46a to suddenly force the inking ribbon 231, the paper strip 40 and the various recording members into close contact. The inking ribbon 231 is of an endless type, passing around the four rollers 52a, 52a and 54a, 54a and having a width suitable to receive all the printing mediums. (See Figures 3 and 10.) This ribbon is given an intermittent movement, and maintained free from slack, by the means previously described. In addition to the above operations, this ten degree depression of the operating handle drops the lock member 221 into position and releases the pawl 180 from the supply spool ratchet 182.

During a continued movement of the operating handle 218 through the remaining 50 degrees of its 60 degree travel as compelled by the full stroke mechanism applied to the shaft 28, a sufficient portion of the tape 40 for a succeeding ticket "b" is withdrawn from the supply spool 18. During this continued movement of the operating handle 218, the reset arm 192 draws the impression block 45 downwardly into engagement with the latch member 195; and by means of the operating slide 174, the unused or stored energy in the spring 161 is released by the ratchet 163 and pawl 164. (See Figure 8.)

Another operation is also effected during this continued depression of the operating handle 218. The quadrant 184 attached to the shaft 28 is rotated 60 degrees to cause the arms 117 and 123 to rotate 120 degrees clockwise, forcing the selector 187 into engagement with the lower projection 126 of the quadrant 124a, thereby rotating the latter until the stop 125 engages the arm 123. (See Figure 4.) This causes the stop 129 to keep the pawl 128 out of engagement with the cam 122 to prevent the clearing of the period value indicator 230 to zero.

The operating handle 218 is returned to its normal position by a spring 232 on the shaft 28. (See Figure 3.) During this return movement of the operating handle, the slide 174 will be moved by the latter, through the means hereinbefore described, to its normal position, thereby causing energy to be stored in the spring 161 to enable the rewind mechanism to take up the paper previously withdrawn from the supply spool.

During the return of the operating handle to its normal position, the pawl 119 will engage the lobes on the cam 116 at some point in its 120 degree return travel. Since the gear 115 secured to the cam 116 and the pinion 93 are in a three-to-one ratio, a sufficient rotation of the pulley 87 will be effected to bring the next indicator 91 into the zero position relative to the slugs 15 and 16. Also, during the return movement of the operating handle, the cam 201 will be prevented from rotating by the pawl 211 to hold the lobes on the cam in proper relation with the bar 206 for the next scale of operations.

When the operating handle has reached the end of its return stroke, the lock member 221 releases the paper strip 40, permitting the stored energy in the rewind mechanism 36 to take up the paper previously withdrawn and bringing the ticket just printed under the opening in the case 1 where the operator, John Doe, may write upon it any designated information such as the date, thus presenting a complete record of his work.

Upon the completion of a job at 9 o'clock, John Doe, the operator, again depresses the operating handle 218, causing to be printed upon the paper tape 40, adjacent the ticket or recording "a", a second recording "b". (See Figure 15.) The arrow 228 will indicate the time of day, 9 o'clock, which provides a check against the position of the job cost indicator 229. The latter and the period value indicator 230 opposite the number 120 in each case, indicate, as shown in Figure 17 at "b", that the cash value of the job for a period of two hours is $1.20 and the period value or total is $1.20. Upon the release of the operating handle 218, the same cycle of operations occur as those described for the printing of the ticket "a". Upon the ticket "b" the operator may also write any desired information. In this case it is "Type 'H' motor", which is the object worked upon. (See Figure 15.)

In a like manner the ticket "c" is produced, the time indicator 228 registering opposite 10.30, indicating the time of completion of the second job. This indicates an elapsed time of 1½ hours since the recording "b" was produced, the job cost indicator standing opposite the 90¢ position, which represents the value of 1½ hours' labor at 60¢ per hour.

Upon the completion of the ticket "b", the job cost indicator 91 was cleared or returned to zero by the cam 116, the clearing arm 117 and the pawl 119 as previously described, but the period value indicator or total indicator was not. (See Figure 16.) Therefore, the job cost indicated as 90¢ on the ticket "c" is added to the period value indicated on the ticket "b", causing the period value indicator 230 in Figure 16 to register $2.10 on the ticket "c", which is the total amount earned since 7 o'clock by the operator, John Doe.

At the noon hour, or "quitting time", John Doe again unlocks the lock 212, and then depresses first the "Out" button and then the operating handle 218, causing to be printed upon the tape 40, the job cost from the printing of the last ticket, and his total earnings, or the period value covering that portion of the day, or in this instance, the morning. Now, since the "Out" button has been depressed, the clearing arm 123 and the pawl 128 will engage the cam 122, thus causing, upon the return stroke of the operating handle, the clearing of both indicators 91, 91 to the starting or zero point.

When the "Out" button is depressed, the finger 150 will hold the spring 108 out of engagement with both of the ratchet wheels 101 and 103, thereby preventing the registration of cash values during the idle periods.

The paper strip 40 upon being removed from the machine, may be cut into tickets as a, b and c in Figure 15, thereby producing convenient records for filing.

Having described my invention, I claim:

1. In a device of the type described, a printing member bearing characters lineally arranged thereon, an endless band movable during part of its travel adjacent said printing member, an indicator carried by said band past said characters, means for intermittently moving said band, a tape movable beneath said printing member, and mechanical means for advancing the tape to and from a printing position thereunder for the purpose specified.

2. In a device of the type described, stationary printing means containing two rows of numbers lineally arranged thereon, one row of numbers representing job cost values and the other row, period values at a given rate, a band movable along each row of numbers, an indicator carried by each band for movement to a respective number, and means for moving said bands during an interval of time to bring the job cost indicator to a number representing the cost of a job performed by an operator during that interval and the other indicator to a number representing the period value of the operator's work for that interval and preceding ones.

In witness whereof I have hereunto set my hand this 3d day of November, 1924.

WILLIAM J. LOVE, Jr.